United States Patent
Leung

(10) Patent No.: US 7,168,090 B2
(45) Date of Patent: *Jan. 23, 2007

(54) MOBILE IP AUTHENTICATION

(75) Inventor: Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/866,654

(22) Filed: Jun. 10, 2004

(65) Prior Publication Data

US 2004/0234075 A1    Nov. 25, 2004

Related U.S. Application Data

(63) Continuation of application No. 09/227,399, filed on Jan. 8, 1999, now Pat. No. 6,760,444.

(51) Int. Cl.
*H04L 29/00* (2006.01)

(52) U.S. Cl. ............... 726/4; 726/6; 380/247; 380/259; 380/270; 713/153; 713/155; 713/168; 709/218; 709/227; 709/229; 455/432.1; 455/433; 455/435.1

(58) Field of Classification Search ........... 380/247, 380/270, 259; 713/153, 155, 168; 709/218, 709/227, 229; 455/432.1, 433, 435.1; 726/4, 726/6

See application file for complete search history.

(56) References Cited

U.S. PATENT DOCUMENTS

| 4,692,918 | A | 9/1987 | Elliott et al. ............... 370/85 |
|---|---|---|---|
| 5,016,244 | A | 5/1991 | Massey et al. ................ 370/16 |
| 5,018,133 | A | 5/1991 | Tsukakoshi et al. ... 340/825.05 |
| 5,218,600 | A | 6/1993 | Schenkyr et al. ............. 370/16 |
| 5,371,852 | A | 12/1994 | Attanasio et al. ........... 395/200 |
| 5,473,599 | A | 12/1995 | Li et al. ....................... 370/16 |
| 5,793,762 | A | 8/1998 | Penners et al. ............. 370/389 |
| 6,119,160 | A | 9/2000 | Zhang et al. ............... 709/224 |
| 6,148,074 | A | 11/2000 | Miloslavsky et al. ....... 379/242 |
| 6,339,830 | B1 | 1/2002 | See et al. ................... 713/202 |
| 6,377,982 | B1 | 4/2002 | Rai et al. |
| 6,535,493 | B1 | 3/2003 | Lee et al. ................... 370/329 |

OTHER PUBLICATIONS

Release notes for 3Com Corporation, "Conducting a Redundant Route for Network Resiliency," Mar. 1994, *NET Builder Family Bridge/Router* pp. 26-29.

(Continued)

*Primary Examiner*—Emmanuel L. Moise
*Assistant Examiner*—Paul Callahan
(74) *Attorney, Agent, or Firm*—Beyer Weaver & Thomas LLP

(57) ABSTRACT

Methods and apparatus for authenticating a mobile node are disclosed. A server is configured to provide a plurality of security associations associated with a plurality of mobile nodes. A packet identifying a mobile node may then be sent to the server from a network device such as a Home Agent. A security association for the mobile node identified in the packet may then be obtained from the server. The security association may be sent to the network device to permit authentication of the mobile node. Alternatively, authentication of the mobile node may be performed at the server by applying the security association.

38 Claims, 9 Drawing Sheets

OTHER PUBLICATIONS

J. Moy, RFC 1247 "OSPF Version 2," Jul. 19, 1991.

D. Oran, RFC 1142, "OSI IS—IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

Network Working Group, RFC 2002 "IP Mobility Support," Oct. 1996.

C. Perkins, "*IP Mobility Support*," RFC2002, IBM Corporation, Oct. 1996.

"*Mobile IP*," Release 12.0(1)T, pp. 1-55.

Montenegro, G., "*Reverse Tunneling for Mobile IP*," RFC 2344, Sun Microsystems, Inc., pp. 1-19, May 1998.

D. Harkins and D. Carrel, "*The Internet Key Exchange (IKE)*," Cisco Systems, pp. 1-33, Jun. 1998.

D. Cong and M. Hamlen, and C. Perkins, "*The Definitions of Managed Objects for IP Mobility Support using SMIv2*," RFC2006, Motorola and IBM, pp. 1-52, Oct. 1996.

C. Finseth, "*An Access Control Protocol, Sometimes Called TACACS*," RFC1492, pp. 1-15, July.

D. Carrel and Lol Grant, "*The TACACS+ Protocol*," Network Working Group, Internet-Draft, Cisco Systems, pp. 1-42, Jan. 1997.

C. Rigney, "*RADIUS Accounting*," RFC 2139, Livingston, pp. 1-25, Apr. 1997.

C. Rigney, et al., "*Remote Authentication Dial in User Service (RADIUS)*," RFC 2138, pp. 1-65 Apr. 1997.

US 7,168,090 B2

MOBILE IP AUTHENTICATION

RELATED APPLICATIONS

This application is a continuation of U.S. patent application/Ser. No. 09/227,399, filed Jan. 8, 1999, entitled "Mobile IP Authentication", by Kent Leung, now U.S. Pat. No. 6,760,444, which is incorporated herein by reference for all purposes.

BACKGROUND OF THE INVENTION

1. Field of the Invention

The present invention relates to Mobile IP network technology. More particularly, the present invention relates to Mobile IP authentication.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow widespread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

During registration of a mobile node with its Home Agent, the identities of the sending party of the registration request (e.g., mobile node) and the sending party of the registration reply (e.g., Home Agent) are authenticated. During the registration process, a Mobile-Home Authentication Extension is typically appended to both the registration request and the registration reply. Upon receipt of the registration request by the Home Agent and the registration reply by the mobile node, the identity of the sending party is authenticated through the application of the Mobile-Home Authentication Extension.

RFC 2002 specifies the packet format for both the registration request and the registration reply packets that are sent between the mobile node and the Home Agent. As shown in FIG. 2, a registration request packet 202 and registration reply packet 204 both include a mandatory Mobile-Home Authentication Extension 206. More specifically, the mandatory Mobile-Home Authentication Extension 206 includes a type field 208, a length field 210, a security parameter index (SPI) field 212, and an authenticator 214. The type field 208 indicates the type of the extension (i.e., Mobile-Home Authentication Extension) and the length field 210 indicates the length of the extension (e.g., bytes). The Security Parameter Index 212 is an identifier which specifies a security association, or "row" in a security-association table, that a receiver should use to interpret a received packet. The security-association, described in further detail below, defines the key and the algorithm to be applied during the authentication process. Both the registration request packet 202 and the registration reply packet 204 include a protected area 216 which includes the registration request 202/registration reply 204, the type field 208, the length field 210, and the security parameter index (SPI) field 212. Both the mobile node and the Home Agent have access to the same secret key, provided by the security-association, which is used to hash this protected area 216 to create the authenticator 214.

FIG. 3 is a process flow diagram illustrating the process steps performed during authentication of a mobile node. As shown, the process begins at step 302 and at step 304, the mobile node constructs a registration request including a protected area. At step 306, the mobile node generates an authenticator by hashing the protected area with the key through application of a specified algorithm. The mobile node then sends the registration request which includes the protected area and the authenticator to the Home Agent at step 308. The Home Agent then identifies all necessary information such as the key and the algorithm used to generate its authenticator from a security-association, corresponding to the SPI of the registration request, at step 310. Next, at step 312, the Home Agent generates its authenticator by hashing the protected area of the registration request with the key using the algorithm identified by the SPI. The Home Agent then compares the authenticator generated by the mobile node with the authenticator generated by the Home Agent. If it is determined at step 314 that the authenticators match, the mobile node is authenticated at step 316 and the process is completed at step 318. However, if the authenticators do not match, the mobile node is not authenticated at step 320 and the process is completed at step 322. Authentication may similarly be performed by the mobile node upon receipt of the registration reply that is sent by the Home Agent. However, a different SPI and therefore security-association may be applied during authentication of the Home Agent.

As described with respect to the authentication process, a Security Association provides information that is used to generate the authenticators during the authentication process. FIG. 4 is a diagram illustrating a conventional security association table that is typically configured on each Home Agent. As shown, a security association table 402 typically includes at least one entry 404 for each mobile node supported by that Home Agent. By way of example, multiple security associations may be applicable to different types of data transfers which have different security requirements. Each entry 404 may include a mobile node identifier 406 for the mobile node such as the IP address of the mobile node and an SPI 408 identifying the security association within the security-association table. In addition, an authentication key 410 (e.g., a secret key) that is shared between the mobile node and the Home Agent is provided (e.g., keyed MD5). An algorithm 412 used to create the authenticator is provided (e.g., RSA Message Digest Algorithm MD5). Moreover, a mode 414 such as prefix, suffix, or prefix-suffix indicates the mode used during authentication. This indicates the portions of the protected region that are hashed with the key. In addition, each entry 404 further includes a replay timer 416, or timestamp, that indicates a maximum time during which the registration request may be replayed. The replay timer protects against unauthorized copying and "replaying" of registration requests for the purpose of defeating authentication.

Security-association tables may potentially include many thousands of entries and therefore consume a substantial amount of memory. As described above, at least one entry is typically provided in such security-association tables for each mobile node supported by the corresponding Home Agent. Moreover, these security-association tables are typically stored in non-volatile memory to prevent destruction of this information. This does not pose a problem when the Home Agent is a workstation having very large hard disks or other forms of non-volatile memory. However, when a network device such as a router or switch serves as the Home Agent, memory, particularly non-volatile memory, is a premium resource. Although the use of non-volatile memory ensures that security-associations will not be irretrievably lost, non-volatile RAM in a typical router is limited. By way of example, the non-volatile RAM may be approximately 128 kilobytes in a typical router. Since each security association consumes approximately 80 bytes of memory, the number of security associations that may be stored on a Home Agent is limited to about 1500. Actually, a portion of the router's NVRAM must be set aside for other purposes, so the actual number of security associations that it can store will be significantly less than the theoretical maximum. In short, the physical limitation in memory makes it impossible to store the security-associations for all mobile nodes that could otherwise be supported by a Home Agent.

In addition, the security-association tables are typically manually configured for each Home Agent. FIG. 5 is a block diagram illustrating a mobile IP network segment and associated environment. Mobile IP environment 502 includes the internet (or a WAN) 504 over which various mobile nodes can communicate remotely via mediation by a corresponding Home Agent (via an appropriately configured router denoted R1). An entity such as a corporation, business, or government may provide multiple Home Agents. Here, a first Home Agent 506, a second Home Agent 508, a third Home Agent 510, a fourth Home Agent 512, and a fifth Home Agent 514 are shown. As shown, such an environment lacks a centralized source of security associations. Therefore, each Home Agent must be separately configured for mobile nodes supported by that Home Agent. Moreover, redundant Home Agents may be provided to permit a Home Agent to serve as a backup to protect against failure by a primary Home Agent. By way of example, the fourth Home Agent 512 and the fifth Home Agent 514 may store identical security-associations in the event that one of the Home Agents fails. Thus, when a security-association is updated (e.g., a key is modified) the security-association must be updated on all of the redundant Home Agents. Accordingly, such a system requires considerable administrative overhead.

In view of the above, it would beneficial if a system having centralized database management were provided to store security-associations for mobile nodes supported by multiple Home Agents as well as perform Mobile IP authentication of these mobile nodes.

SUMMARY OF THE INVENTION

The present invention provides methods and apparatus for providing and accessing a centralized repository (e.g., server) as a source for security associations. In this manner, configuration, modification, and retrieval of security associations may be performed in a single location. Accordingly, security associations may be retrieved to authenticate mobile nodes at the Home Agent as well as at the server.

According to one aspect of the invention, a server supporting Mobile IP is provided. A packet identifying a mobile node is received from a Home Agent. A security association for the mobile node is then obtained from the server. The security association may then be sent to the Home Agent. Alternatively, the mobile node may be authenticated at the server by applying the security association. A reply packet acknowledging authentication of the mobile node may then be sent to the Home Agent.

According to another aspect of the invention, a method for authenticating a mobile node in a Home Agent is provided. A server may be identified as a source of security associations for the Home Agent. A packet identifying a mobile node is then sent to the server. A security association for the mobile node identified in the packet is then received. The Home Agent may then authenticate the mobile node using the security association.

According to yet another aspect of the invention, another method for authenticating a mobile node in a Home Agent is provided. A server may be identified as a source of security associations for the Home Agent. A request packet identifying the mobile node is then sent to the server. Once authentication of the mobile node is performed by the server, a reply packet indicating a status of authentication of the mobile node is received.

The present invention provides methods and apparatus for configuration, modification, and retrieval of security associations. In this manner, the number of security associations that may be stored for each Home Agent is increased. Moreover, administrative support required to configure and modify the security associations is substantially reduced.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 5:
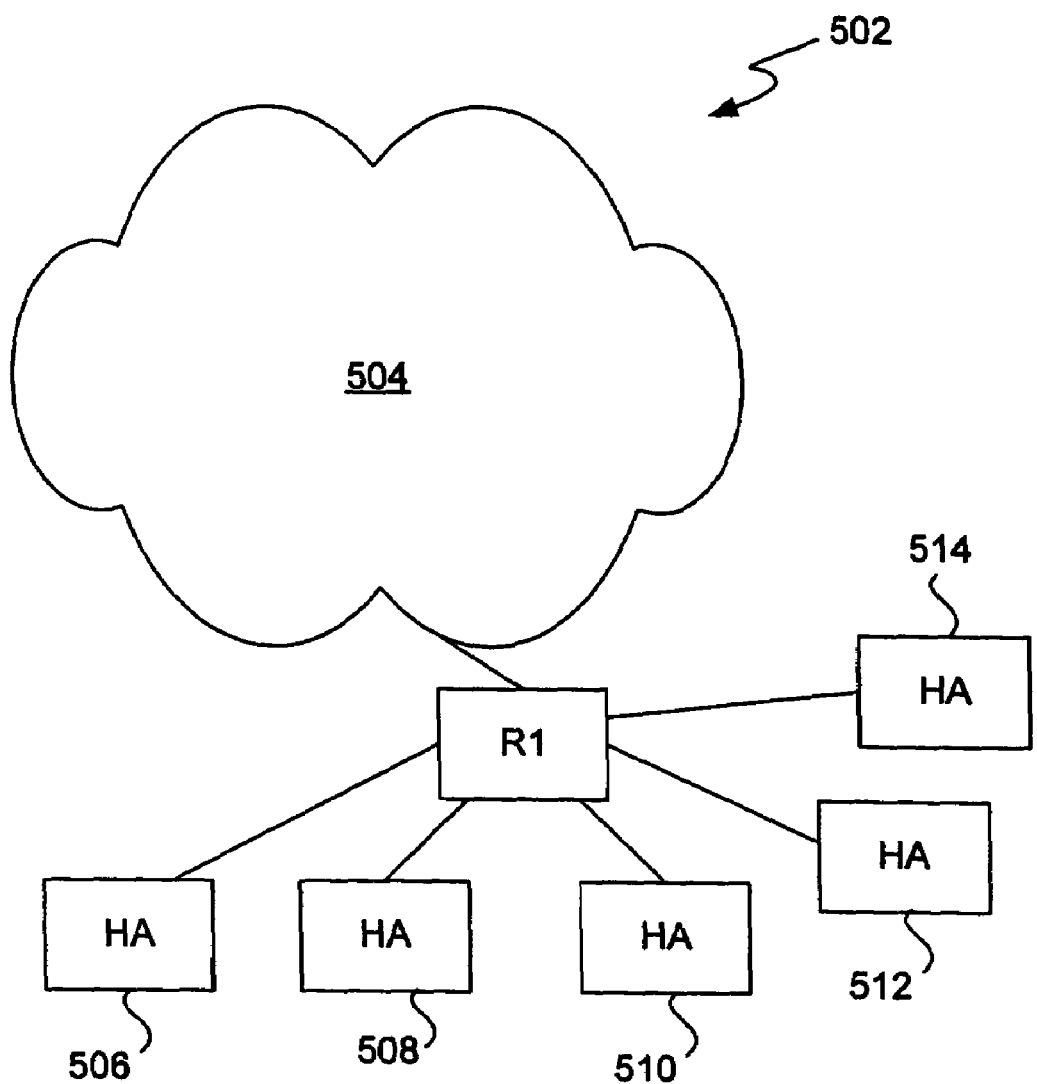
FIG. 5 is a block diagram illustrating a mobile IP network segment and associated environment without a centralized source of security associations.

As described above with reference to FIG. 5, due to the lack of a centralized database, the number of mobile nodes that may be supported by each Home Agent is limited. Moreover, since each Home Agent must be separately configured, such a system requires a considerable amount of administrative support and increases the probability that errors may be introduced by a user configuring the systems. Accordingly, it would be desirable if a single system having a centralized repository were implemented to store some or all of the security associations for the mobile nodes supported by one or more Home Agents.

Figure 6:
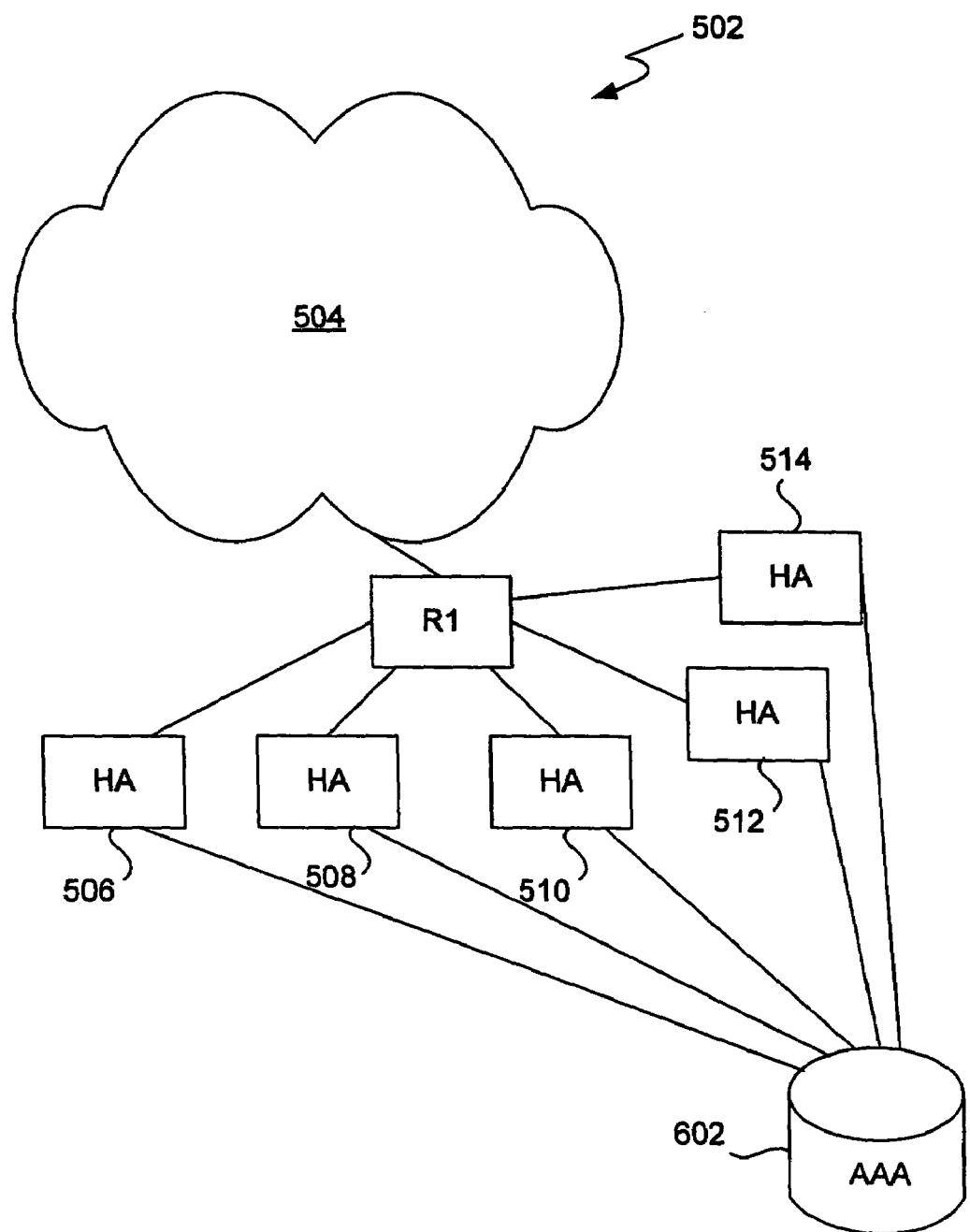
FIG. 6 is a block diagram illustrating a mobile IP network segment and associated environment having a centralized database as a source for security associations according to one embodiment of the invention.

An invention is described herein that provides such a centralized repository (e.g., a database). FIG. 6 is a block diagram illustrating a mobile IP network segment and associated environment having a centralized database as a source for security associations according to one embodiment of the invention. Unlike the system of FIG. 5, an environment in which a centralized database, or server 602, is provided. As shown, the server may coupled to multiple Home Agents via a network. In addition, this centralized server 602 may be adapted for performing Mobile IP functions as implemented by software, hardware, and/or firmware.

In addition to providing a centralized server which is capable of storing security-associations for multiple Home Agents, the centralized server may provide further services. By way of example, the centralized server may provide authentication services and/or authorization services. While authentication determines who an entity is, authorization determines what services a user is allowed to perform, or access. Various protocols such as the Remote Authentication Dial In User Service (RADIUS) and TACACS+ may be implemented to provide such a server. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

In addition, each Home Agent may be configured to include a mobile node list identifying mobile nodes supported by the Home Agent. Conventionally such a mobile node list includes the identities of mobile nodes handled by the Home Agent as well as security associations stored on the Home Agent. However, according to the present invention, the list of security associations may be provided with a server that is identified as a source of security associations for the mobile nodes.

Figure 7:
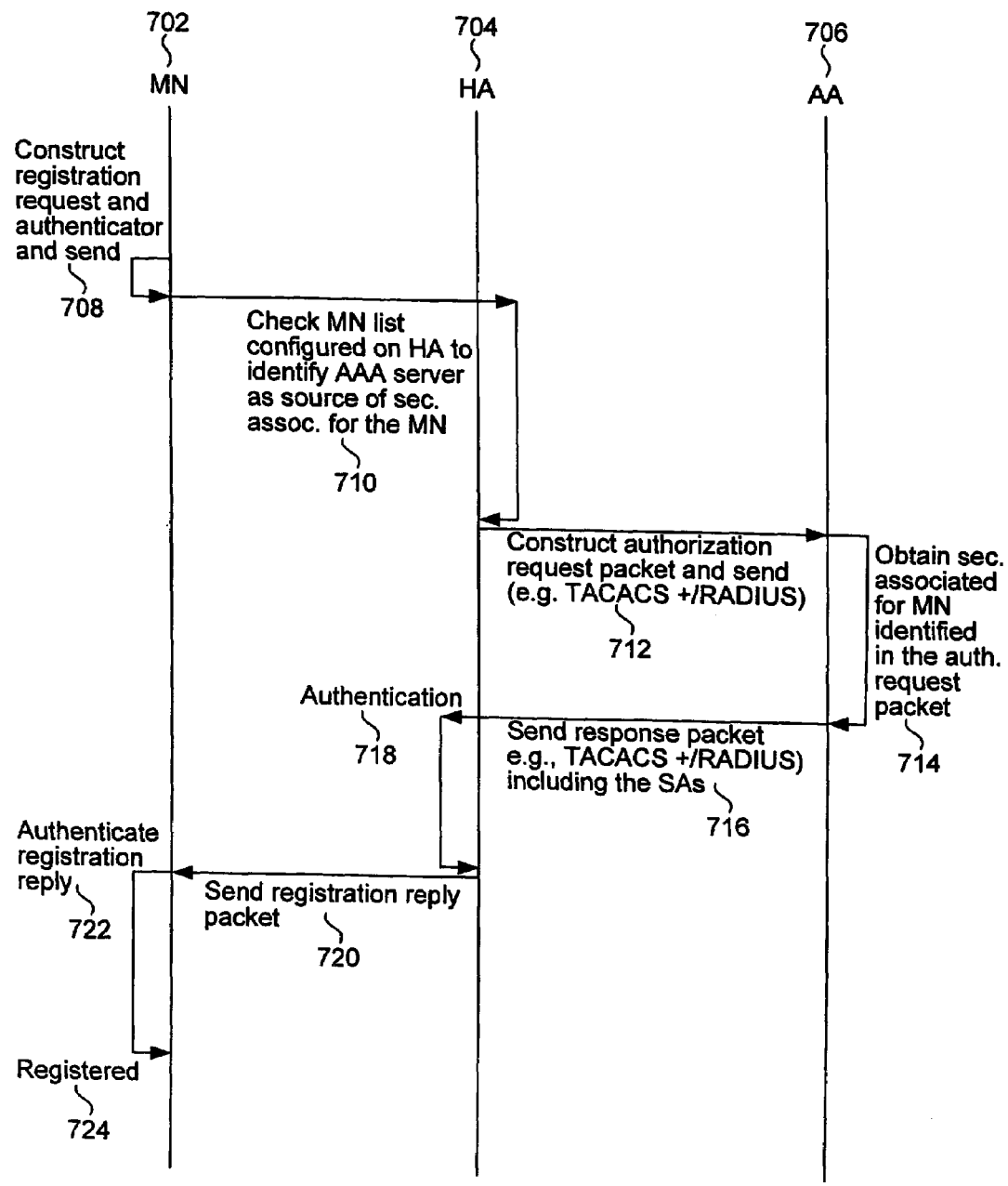
FIG. 7 is a process flow diagram illustrating the steps performed during authentication of a mobile node according to a first embodiment of the invention.

According to a first embodiment, a mobile node may be authenticated by sending the security association for the mobile node from the server to the mobile node's Home Agent. The Home Agent then authenticates the mobile node based upon the security association. FIG. 7 is a process flow diagram illustrating the steps performed during authentication of a mobile node according to a first embodiment. As shown, process steps performed by the mobile node are illustrated along vertical line 702, steps performed by the Home Agent are illustrated along vertical line 704, and steps performed by the server are illustrated along vertical line 706.

It is important to note that the server may provide conventional authentication and accounting services as well as authorization services. RADIUS and TACACS+ conventionally provide authentication, authorization, and accounting services. Thus, these protocols are well suited for the servers of the present invention. However, the invention is not limited to these protocols. Other authentication, authorization, and accounting protocols may be used. In fact, any server that can safely store and provide security associations will be appropriate for this invention.

During the registration process, the mobile node first constructs a registration request including an authenticator and sends the registration request to the Home Agent at step 708. The Home Agent then identifies the mobile node and determines which server handles security associations for that mobile node at step 710. By way of example, a mobile node list configured on the Home Agent may include the mobile node identities together with the server(s) associated with the mobile nodes (e.g., servers containing the security association for the mobile node). Typically, but not necessarily, a single server handles all the security associations for a given Home Agent.

Now the Home Agent must obtain the security association from the server. It accomplishes this by constructing a packet in a format understood by the server. In the case of a TACACS+ server, the packet may assume the form of an authorization request packet, for example. Alternatively, the packet may be a TACACS+ authentication packet. Corresponding packet formats for RADIUS may also be used. The Home Agent sends such packet (including the identity of the mobile node requesting registration) to the server at step 712. The mobile node may be identified by its IP address.

Figure 1:
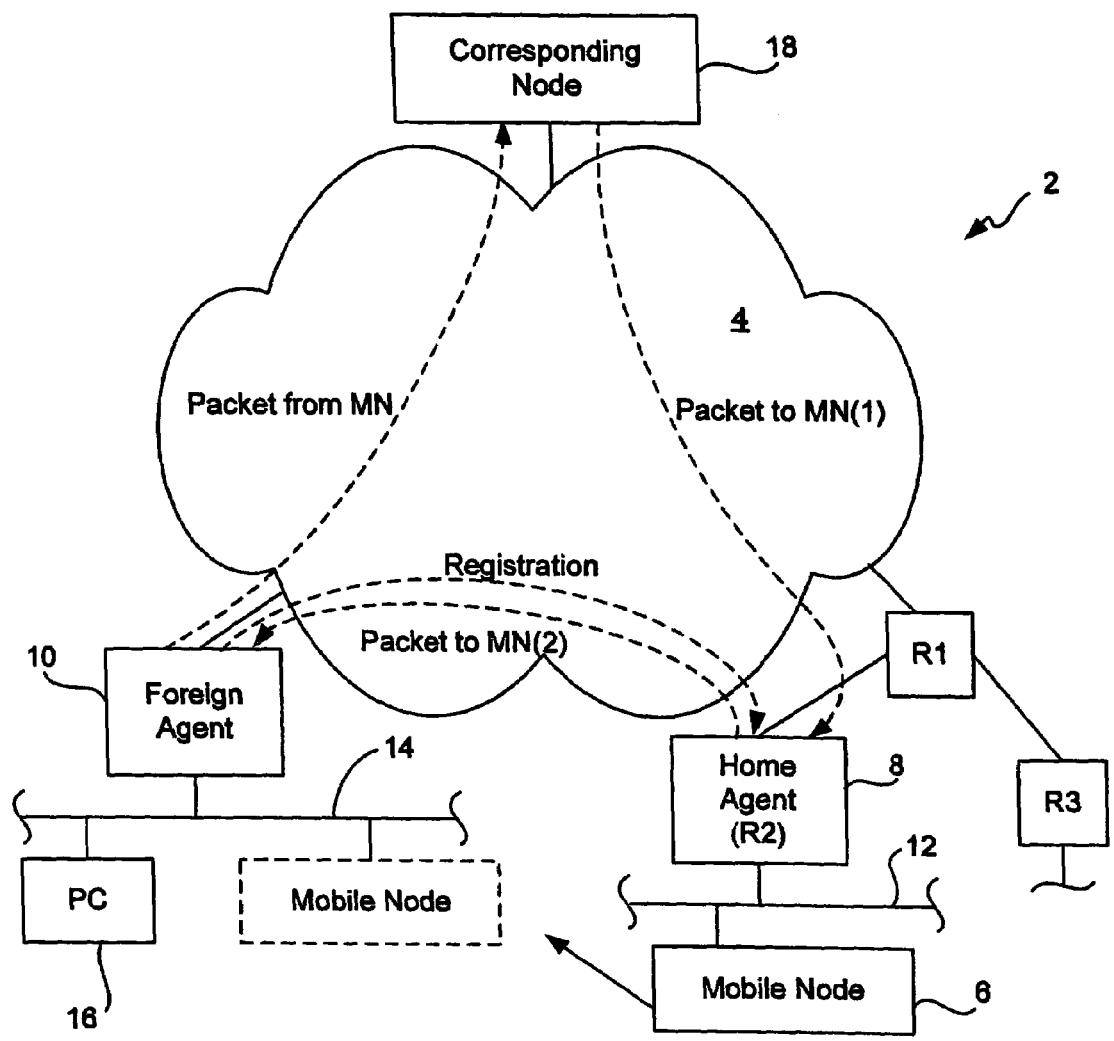
FIG. 1 is a diagram illustrating a Mobile IP network segment and associated environment.
Figure 2:
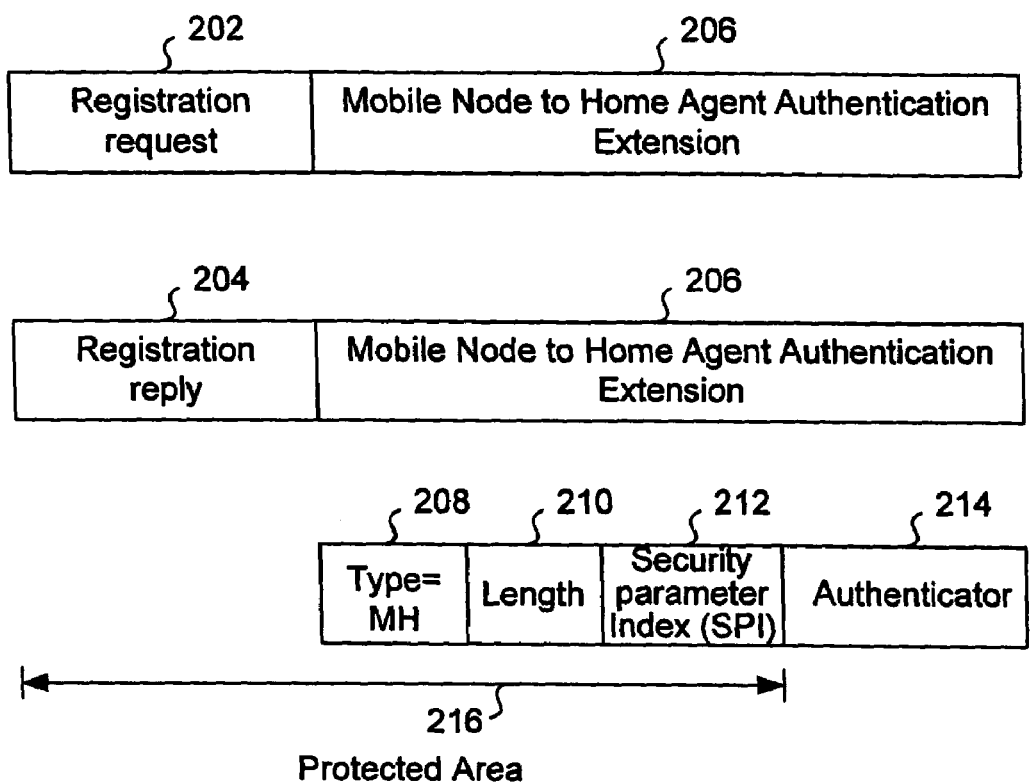
FIG. 2 is a diagram illustrating conventional Registration Request and Registration Reply packet formats having a Mobile-Home Authentication Extension.
Figure 3:
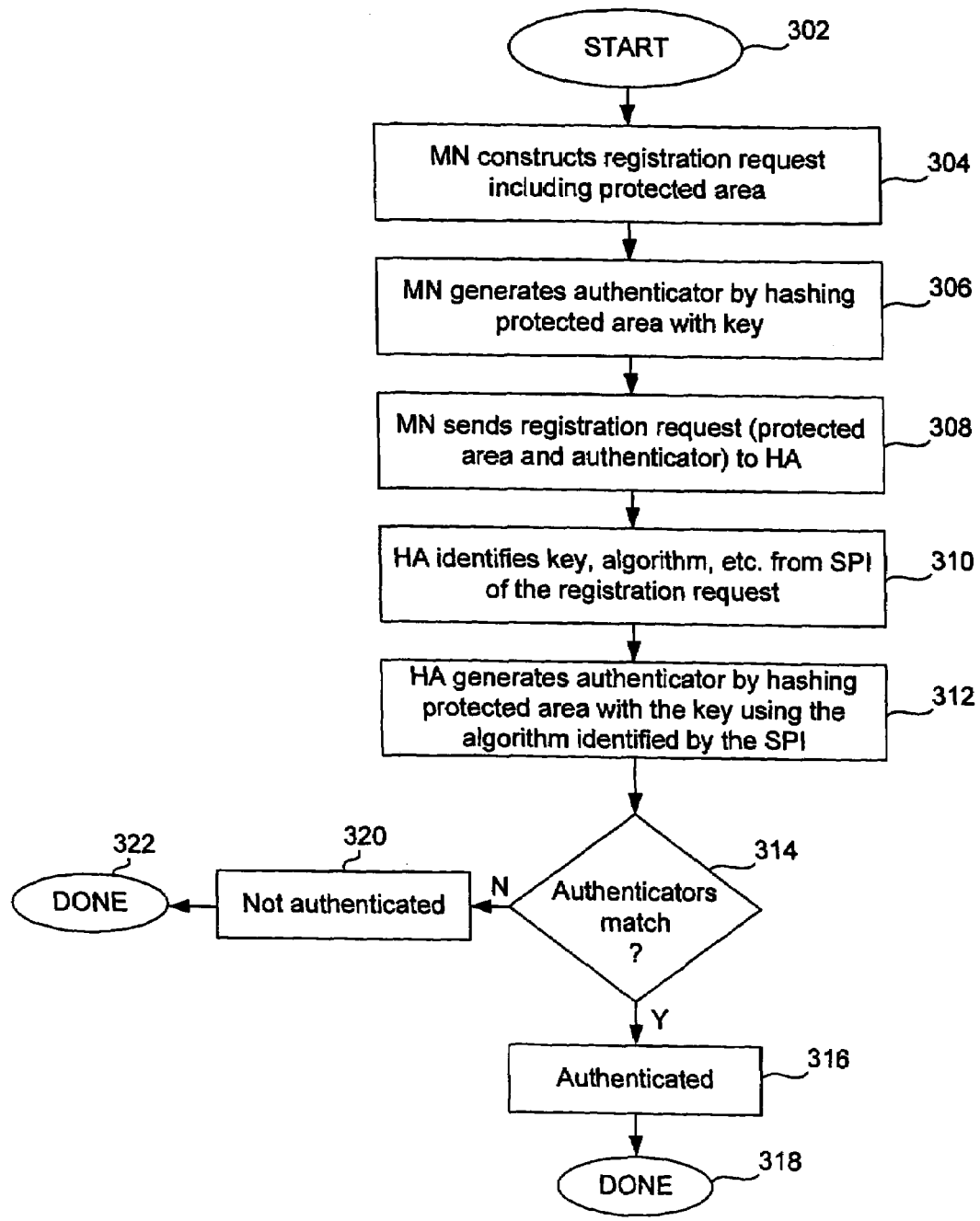
FIG. 3 is a process flow diagram illustrating the process steps performed during authentication of a mobile node.
Figure 4:
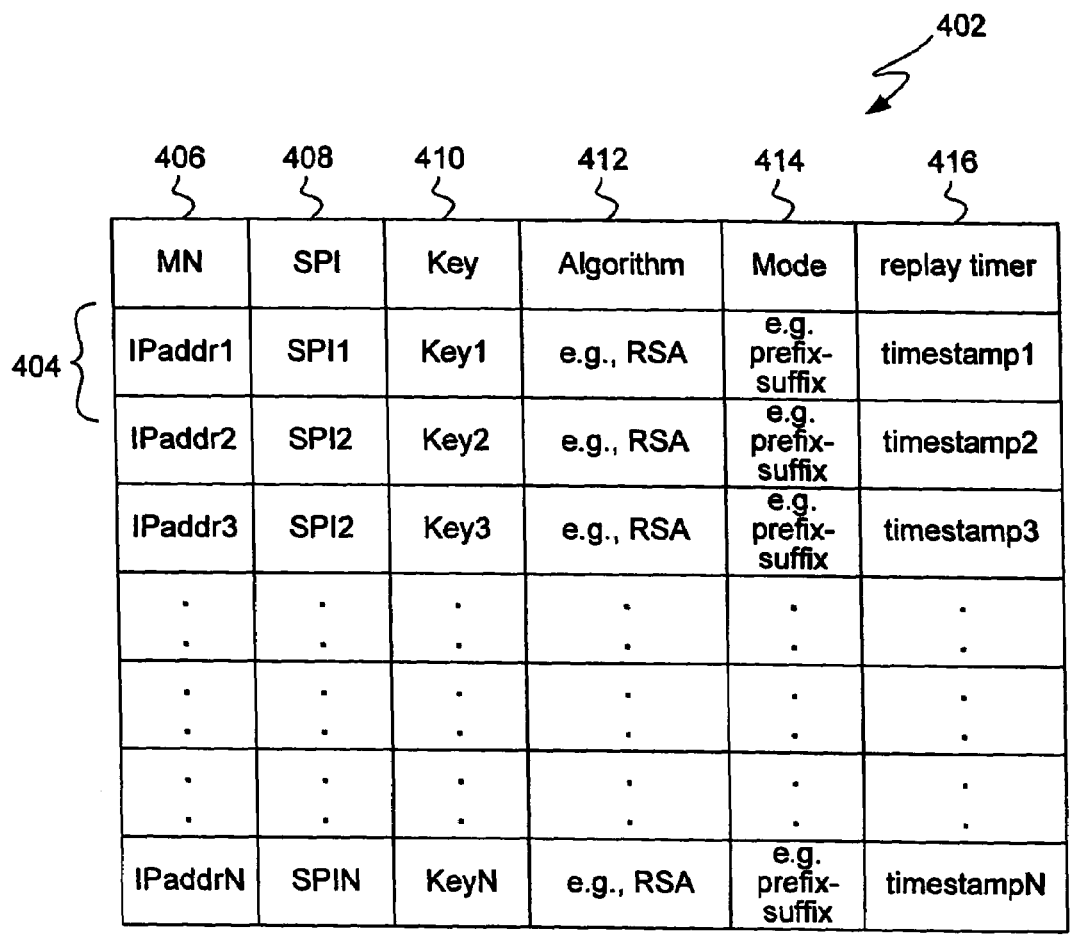
FIG. 4 is a diagram illustrating a conventional Security Association.

At step 714, the server receives the packet identifying the mobile node (e.g., an authorization request packet) from the Home Agent. It then obtains a security association for the mobile node identified in this packet. By way of example, the security association may be obtained from a security-association table such as that illustrated in FIG. 4. Now server 706 must send the security association to the Home Agent for authentication of the mobile node (716). The server constructs a packet in the appropriate format (e.g., a TACACS+ authorization reply packet) and includes the security association. The packet is sent to Home Agent 704 as illustrated. In a preferred embodiment, the response packet indicates a status of authorization of the mobile node. By way of example, the status may be implemented in TACACS+ to indicate a status such as whether the authorization passed or failed. Typically, the authorization must pass for the Home Agent to continue authenticating the registration request.

Note that as mobile node 702 roams, it may frequently shift from one foreign agent to another (or from one care of address to another). This requires that the Home Agent repeatedly authenticate the same mobile node. The security association may be retrieved from the server each time mobile node 702 sends a fresh registration request. To reduce the effort associated with this, the security association may be temporarily loaded into memory (e.g., a portion of DRAM) of the Home Agent. In this manner, some transfers of security associations from the server to the Home Agent are eliminated. A suitable algorithm for clearing security associations from the Home Agent's memory may be employed (e.g., a least recently used (LRU) algorithm). While this approach can reduce traffic between server and Home Agent—and thereby eliminate attendant delay—it must also account for modifications of security associations (e.g., keys) on the server. If the Home Agent looks to its local copy of a security association that is being modified at the server, then the modification should be copied to the Home Agent.

Upon receiving the security association in the response packet indicating a status of authorization of the mobile node, the Home Agent may authenticate the mobile node at step 718. A conventional Mobile IP authentication procedure (see RFC 2002) may be employed. The Home Agent then sends a registration reply to the mobile node at step 720. The mobile node may then authenticate the registration reply at step 722 (per a normal Mobile IP procedure for example) and the mobile node is registered at step 724.

Figure 8:
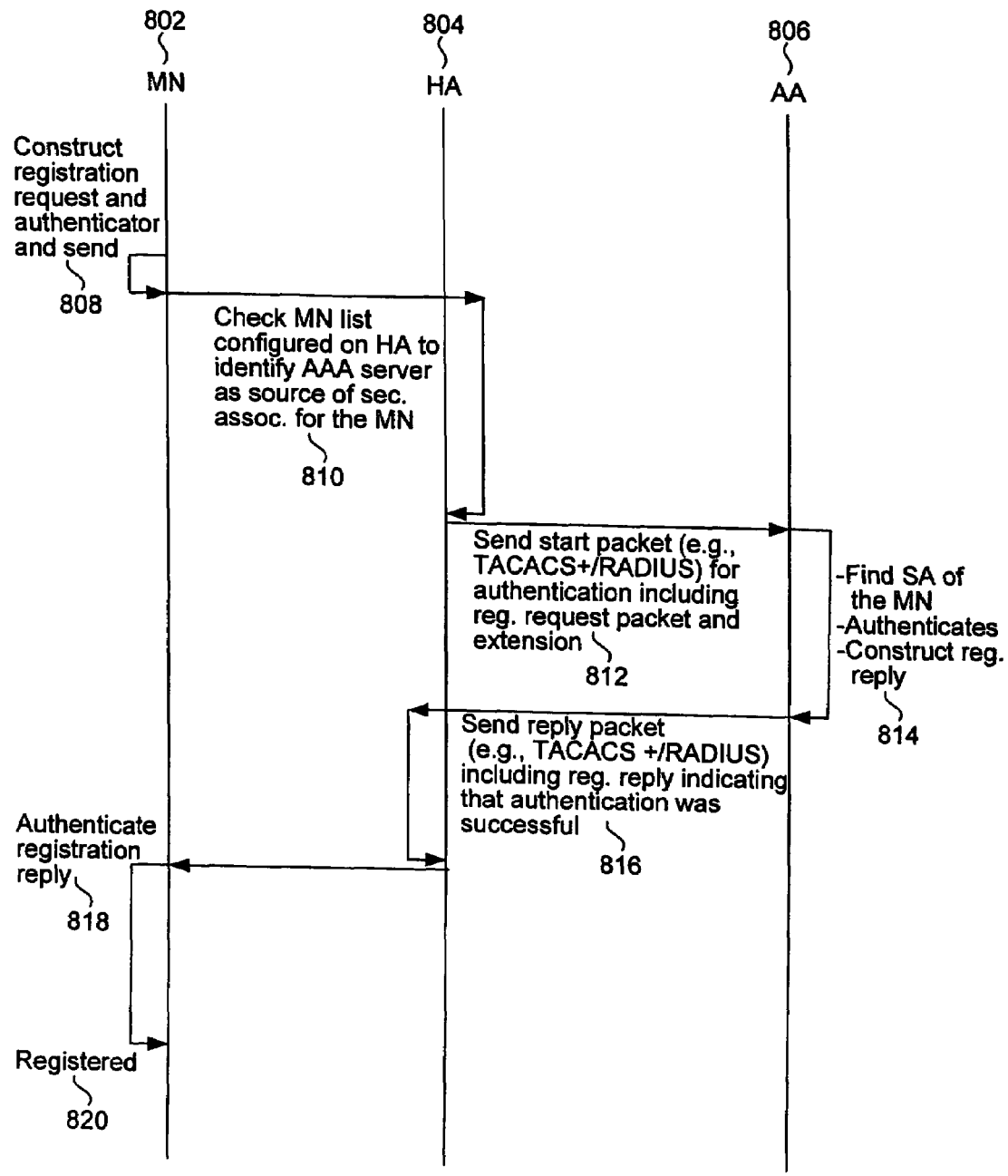
FIG. 8 is a process flow diagram illustrating the steps performed during authentication of a mobile node according to a second embodiment of the invention.

Although authentication may be performed by the Home Agent upon receiving the security association from the server, it may be preferable to perform the authentication at the server. FIG. 8 is a process flow diagram illustrating the steps performed during authentication of a mobile node according to a second embodiment of the invention. As shown, process steps performed by the mobile node are illustrated along vertical line 802, steps performed by the Home Agent are illustrated along vertical line 804, and steps performed by the server are illustrated along vertical line 806. Again, the server is preferably an AAA server that can provide authorization and accounting services as well as authentication services.

The mobile node initially constructs a registration request including an authenticator contained in a Mobile-Home Authentication Extension which is sent to the Home Agent at step 808. The Home Agent then identifies a server (i.e., server 806) as a source of security associations for the Home Agent at step 810. By way of example, a mobile node list configured on the Home Agent that includes the mobile node may be located and the server associated with the mobile node list (e.g., containing the security association for the mobile node) may be ascertained.

Next, the Home Agent constructs and sends a packet containing the Mobile IP request (e.g., a TACACS+ authentication request packet) to the server at step 812. By way of example, in accordance with the TACACS+ Protocol, the authentication request may include a START packet. As yet another example, in accordance with the RADIUS Protocol, the authentication request may include an ACCESS-REQUEST packet. The authentication request identifies the mobile node requesting registration and being authenticated. By way of example, the mobile node may be identified by its IP address. In addition, the authentication request packet preferably includes the Mobile IP registration request sent at 808 (i.e., a registration request packet having a Mobile-Home authentication extension).

At step 814, the server receives the request packet sent by the Home Agent. The server may then authenticate the mobile node using a security association associated with the mobile node identified in the authentication request. By way of example, the security association may be obtained from the server through the use of a security-association table such as that illustrated in FIG. 4. The server may then authenticate the mobile node using a protocol such as TACACS+ or RADIUS. During authentication, the security association may be applied to the registration request and the Mobile-Home authentication extension. By way of example, an algorithm such as the RSA Message Digest Algorithm MD5 may be used to authenticate the mobile node. After authenticating the mobile node, a reply packet is constructed and sent to the Home Agent at step 816 indicating a status of authentication of the mobile node. By way of example, in accordance with the TACACS+ Protocol, the reply packet may be a REPLY packet. As yet another example, in accordance with the RADIUS Protocol, the reply packet may be provided in an ACCESS-ACCEPT packet or an ACCESS-REJECT packet. In addition, the reply may include a Mobile IP registration reply. The reply is then received by the mobile node at step 818. The mobile node may then be registered at step 820.

Since the memory of the server is more abundant than a Home Agent's NVRAM, the number of security associations that may be stored for each Home Agent is substantially increased. Moreover, since the server provides for centralized administration and storage of the security associations, administrative support that is required is minimized. Accordingly, configuration as well as modification of security associations (e.g., keys) may be performed in a single location.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, and/or mobile node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Figure 9:
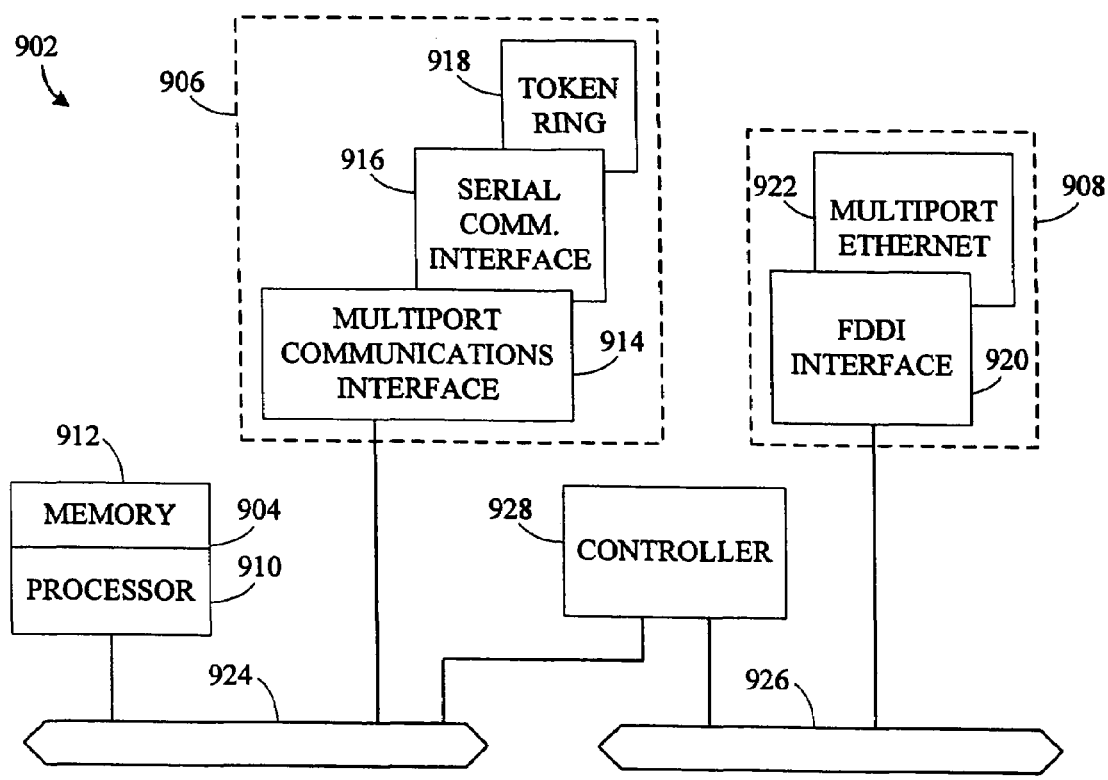
FIG. 9 is a block diagram of a network device that may be configured to implement aspects of the present invention.

Referring now to FIG. 9, a router/agent 902 of the present invention includes a master central processing unit (CPU) 904, low and medium speed interfaces 906, and high speed interfaces 908. When acting under the control of appropriate software or firmware, the CPU 904 is responsible for such router tasks as routing table computations and network management. It is also responsible for registration, packet tunneling and other Mobile IP functions of a Home Agent or a Foreign Agent. It may include one or more microprocessor chips 910 selected from complex instruction set computer (CISC) chips (such as the Motorola MPC860 microprocessor or the Motorola 68030 microprocessor, reduced instruction set computer (RISC) chips, or other available chips. In a preferred embodiment, a memory 912 (such as non-volatile RAM and/or ROM) also forms part of CPU 904. However, there are many different ways in which memory could be coupled to the system.

The interfaces 908 and 906 are typically provided as interface cards. Generally, they control the sending and receipt of data packets over the network and sometimes support other peripherals used with the router 902. The low and medium speed interfaces 906 include a multiport communications interface 914, a serial communications interface 916, and a token ring interface 918. The high speed interfaces 908 include an FDDI interface 920 and a multiport ethernet interface 922. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara California), and in some instances (3) volatile RAM. The independent processors control such communications intensive tasks as packet switching and filtering, and media control and management. By providing separate processors for the communications intensive tasks, this architecture permits the master microprocessor 904 to efficiently perform routing computations, network diagnostics, security functions, etc.

The low and medium speed interfaces are coupled to the master CPU 904 through a data, control, and address bus 924. High speed interfaces 908 are connected to the bus 924 through a fast data, control, and address bus 926 which is in turn connected to a bus controller 928. The bus controller functions are provided by a processor such as a 2901 bit slice processor.

Although the system shown in FIG. 9 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router. Still further, in some cases, the invention can be implemented on network devices other than routers.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A server configured to receive an authentication request from a Home Agent which supports Mobile IP, the authentication request identifying a mobile node, the server comprising:

means for providing a plurality of security associations, the plurality of security associations being associated with a plurality of mobile nodes, the means for providing a plurality of security associations being a repository for the plurality of security associations for one or more Home Agents supporting the plurality of mobile nodes; and means for authenticating the mobile node using a security association associated with the mobile node in response to the authentication request received from the Home Agent, wherein the Home Agent does not store the security association associated with the mobile node identified in the authentication request, wherein the server is not a Home Agent or a Foreign Agent.

2. The server as recited in claim 1, wherein the security association associated with the mobile node is obtained from the plurality of security associations.

3. The server as recited in claim 1, wherein the plurality of mobile nodes are associated with a plurality of Home Agents.

4. The server as recited in claim 1, wherein the server further comprises:
means for sending an authentication reply to the Home Agent, the authentication reply indicating a status of authentication of the mobile node.

5. The server as recited in claim 4, wherein the authentication request is provided in a packet including a mobile IP registration request and the authentication reply includes a registration reply.

6. The server as recited in claim 4, wherein the authentication reply is sent in response to an authentication start packet.

7. The server as recited in claim 4, wherein the authentication reply is provided in one of an access-accept packet and an access-reject packet, and the authentication request is provided in an access-request packet.

8. The server as recited in claim 1, wherein the server is adapted for authenticating the mobile node according to an RSA Message Digest Algorithm MD5.

9. The server as recited in claim 1, wherein the server is a TACACS+ or RADIUS server.

10. A server configured to receive a packet from a Home Agent which supports Mobile IP, the packet identifying a mobile node, the server comprising:
means for providing a plurality of security associations, the plurality of security associations being associated with a plurality of mobile nodes, the means for providing a plurality of security associations being a repository of security associations for the Home Agent; and
means for authenticating the mobile node by sending to the Home Agent a security association associated with the mobile node in response to the packet received from the Home Agent, wherein the Home Agent does not store the security association prior to receiving the security association from the server, wherein the server is not a Home Agent or a Foreign Agent.

11. The server as recited in claim 10, wherein the plurality of mobile nodes are associated with a plurality of Home Agents.

12. The server as recited in claim 10, wherein the server is adapted for sending the security association in response to the packet from the Home Agent identifying the mobile node.

13. The server as recited in claim 10, wherein the server is adapted for authenticating the mobile node according to an RSA Message Digest Algorithm MD5.

14. The server as recited in claim 10, wherein the server is a TACACS+ or RADIUS server.

15. The server as recited in claim 10, wherein the security association includes a mobile node identifier and an SPI.

16. The server as recited in claim 15, wherein the security associating further includes an authentication key.

17. A computer-readable medium storing thereon computer-readable instructions that when read cause a computer to carry out the steps for authenticating a mobile node in a Home Agent, comprising:
instructions for identifying a server as a source of security associations for the Home Agent, wherein the server is not a Home Agent or a Foreign Agent;
instructions for sending a packet to the server, the packet identifying a mobile node supported by the Home Agent, wherein the Home Agent does not maintain security associations for each of the mobile nodes supported by the Home Agent; and
instructions for receiving a security association for the mobile node identified in the packet.

18. The computer-readable medium as recited in claim 17, wherein the instructions for identifying a server comprises:
instructions for locating a mobile node list configured on the Home Agent, the mobile node list including the mobile node; and
instructions for ascertaining the server containing the security association for the mobile node.

19. The computer-readable medium as recited in claim 17, further comprising:
instructions for receiving a response packet from the server, the response packet indicating a status of authorization of the mobile node.

20. A computer-readable medium storing thereon computer-readable instructions that when read cause a computer to carry out the steps for authenticating a mobile node in a server supporting Mobile IP, comprising:
instructions for receiving a packet from a Home Agent, the packet identifying a mobile node supported by the Home Agent for which the Home Agent is requesting a security association;
instructions for obtaining a security association for the mobile node identified in the packet from the server, wherein the server is not a Home Agent or a Foreign Agent; and
instructions for sending the security association to the Home Agent, thereby enabling the Home Agent to authenticate the mobile node.

21. A computer-readable medium storing thereon computer-readable instructions that when read cause a computer to carry out the steps for authenticating a mobile node in a Home Agent, comprising:
instructions for identifying a server as a source of security associations for the Home Agent, wherein the Home Agent does not store security associations for each of the mobile nodes supported by the Home Agent, wherein the server is not a Home Agent or a Foreign Agent;
instructions for sending a request packet to the server, the request packet identifying the mobile node; and
instructions for receiving a reply packet for the mobile node identified in the request packet, the reply packet indicating a status of authentication of the mobile node.

22. The computer-readable medium as recited in claim 21, wherein the instructions for identifying a server comprises:
instructions for locating a mobile node list configured on the Home Agent, the mobile node list including the mobile node; and
instructions for ascertaining the server associated with the mobile node.

23. The computer-readable medium as recited in claim 21, wherein the request packet is an authentication start packet.

24. The computer-readable medium as recited in claim 21, wherein the reply packet is one of an access-accept packet and an access-reject packet when the request packet is an access-request packet.

25. The computer-readable medium as recited in claim 21, wherein the server is a TACACS+ server or a RADIUS server.

26. A computer-readable medium storing thereon computer-readable instructions that when read cause a computer to carry out the steps for authenticating a mobile node in a server supporting Mobile IP, comprising:
instructions for receiving a request packet from a Home Agent, the request packet identifying the mobile node;
instructions for obtaining a security association for the mobile node identified in the request packet;

instructions for authenticating the mobile node by applying the security association, wherein the server is a repository of security associations for the Home Agent, wherein the server is not a Home Agent or a Foreign Agent; and instructions for sending a reply packet to the Home Agent.

27. The computer-readable medium as recited in claim 26, wherein the request packet is an authentication start packet.

28. The computer-readable medium as recited in claim 26, wherein the reply packet is one of an access-accept packet and an access-reject packet when the request packet is an access-request packet.

29. The computer-readable medium as recited in claim 26, wherein the server is a TACACS+ or a RADIUS server.

30. A Home Agent supporting Mobile LIP, comprising:

means for generating a mobile node list identifying mobile nodes supported by the Home Agent, the mobile node list identifying at least one server as a source of security associations for the mobile nodes, wherein the server is not a Home Agent or a Foreign Agent, wherein the Home Agent does not maintain the security associations for the mobile nodes; and means for contacting the at least one server in order to authenticate one of the mobile nodes.

31. The Home Agent as recited in claim 30, wherein the Home Agent is configured to send a mobile node identifier to the server.

32. The Home Agent as recited in claim 30, wherein the server is a TACACS+ or a RADIUS server.

33. The Home Agent as recited in claim 30, wherein the Home Agent is implemented on a router or switch.

34. The Home Agent as recited in claim 30, wherein the Home Agent does not store security associations for all the mobile nodes it supports.

35. A Home Agent adapted for authenticating a mobile node, comprising:

means for identifying a server as a source of security associations for the Home Agent, wherein the server is not a Home Agent or a Foreign Agent;

means for sending a packet to the server, the packet identifying a mobile node supported by the Home Agent, wherein the Home Agent does not maintain security associations for each of the mobile nodes supported by the Home Agent; and means for receiving a security association for the mobile node identified in the packet.

36. A server supporting Mobile IP adapted for authenticating a mobile node, comprising:

means for receiving a packet from a Home Agent, the packet identifying a mobile node supported by the Home Agent for which the Home Agent is requesting a security association;

means for obtaining a security association for the mobile node identified in the packet from the server, wherein the server is not a Home Agent or a Foreign Agent; and means for sending the security association to the Home Agent, thereby enabling the Home Agent to authenticate the mobile node.

37. A Home Agent adapted for authenticating a mobile node, comprising:

means for identifying a server as a source of security associations for the Home Agent, wherein the Home Agent does not store security associations for each of the mobile nodes supported by the Home Agent, wherein the server is not a Home Agent or a Foreign Agent;

means for sending a request packet to the server, the request packet identifying the mobile node; and means for receiving a reply packet for the mobile node identified in the request packet, the reply packet indicating a status of authentication of the mobile node.

38. A server supporting Mobile IP adapted for authenticating a mobile node, comprising:

means for receiving a request packet from a Home Agent, the request packet identifying the mobile node;

means for obtaining a security association for the mobile node identified in the request packet;

means for authenticating the mobile node by applying the security association, wherein the server is a repository of security associations for the Home Agent, wherein the server is not a Home Agent or a Foreign Agent; and means for sending a reply packet to the Home Agent.

* * * * *